Dec. 13, 1927.

N. A. WAHLBERG 1,652,506

LINK TYPE INSULATOR

Filed Oct. 11, 1923

WITNESSES:
R. S. Harrison
F. H. Miller

INVENTOR
Nils A. Wahlberg
BY
Wesley G. Carr
ATTORNEY

Patented Dec. 13, 1927.

1,652,506

UNITED STATES PATENT OFFICE.

NILS A. WAHLBERG, OF WILKINSBURG, PENNSYLVANIA, ASSIGNOR TO WESTINGHOUSE ELECTRIC & MANUFACTURING COMPANY, A CORPORATION OF PENNSYLVANIA.

LINK-TYPE INSULATOR.

Application filed October 11, 1923. Serial No. 667,857.

My invention relates to insulators and particularly to insulators of the link type.

One object of my invention is to provide an insulator of the above described character, that shall be simple in construction and have greater strength than similar insulators heretofore employed.

Another object of my invention is to provide an insulator of the link type in which certain normally shearing stresses are transformed into substantially compression stresses.

A further object of my invention is to provide a link insulator in which a stranded connecting member and the seat therefor are constructed and related to more effectively distribute the strands of the stranded member.

Heretofore, in insulators of the link type, it has been usual to provide round stranded cable connectors and insulating members having rounded seats for the connectors. This construction causes a very considerable proportion of the total load stresses to be lateral or shearing stresses, thereby fracturing the insulating member below the ultimate rupture strength of the cable.

To overcome the above mentioned objection, it has heretofore been suggested to employ flat seats and flat-strap connectors but, to the best of my knowledge, no such suggestions have been extensively or commercially adopted because straps of commercial materials are weaker than stranded cables and are not as readily adapted for link-insulator service.

In practicing my invention, I provide an insulator, which may be considered a compromise between the insulator of the two above described types having a seat portion of such cross-sectional contour as to permit the use of a rounded stranded cable and to greatly increase the strength of the device as a unit.

I have found that to construct the connector seat of a link insulator, at its surface transverse to the longitudinal axis of the cable, to be substantially flat or of very great radius relative to the radius of the cable, the cable strands are so redistributed under tension as to utilize substantially the maximum strength of both the insulating member and the cable. In other words, there is a critical contour of the cable seat which must lie between a flat surface transverse to the cable axis and a curve of very great radius relative to the radius of the cable extending beyond the sides of the cable, a sufficient distance to be clear of the latter when the cable strands on the seat are redistributed under tension.

Figure 1:
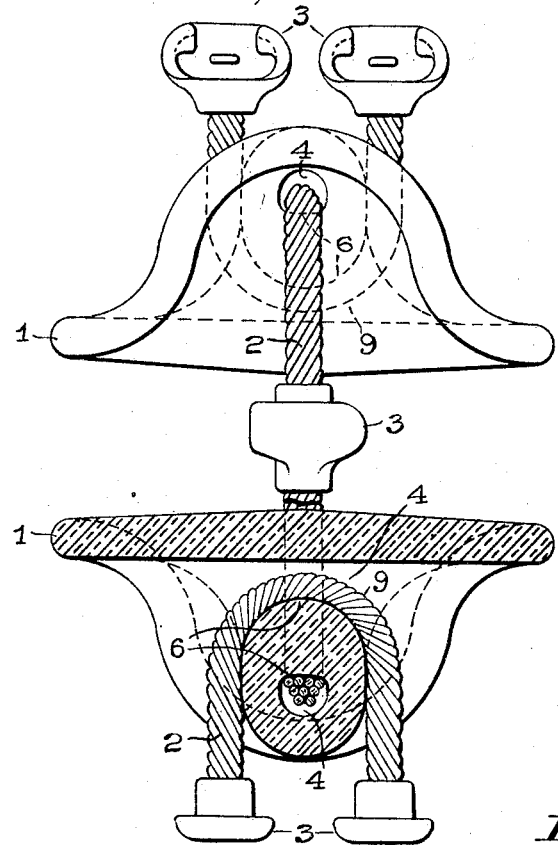
Figure 2:
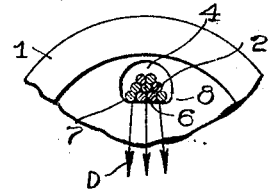

Figure 1 of the accompanying drawing is a side view, partly in elevation and partially in section, of a link insulator device embodying my invention, and Fig. 2 is a diagrammatic view, showing the kind and direction of stresses therein.

My invention comprises, in general, one or more insulating members 1, preferably of porcelain and of a usual and well-known substantially saddle shape, a stranded cable member or members 2 of substantially U-shape and ball-and-socket or other members 3 for connecting the ends of the cable members 2.

As shown in Fig. 1, each cable member 2 of the respective insulator units interlinks with the next member 2 thereof through openings 4 in the member 1, by which the members 2 are insulated from each other, and is joined in end-to-end relation to the adjacent member 2 of the next insulator unit by the members 3, in a usual and well-known manner.

In link insulators as heretofore constructed with circular openings in which the cables of U-shape are disposed, the longitudinal load stresses of the insulator are resolved into direct compression stresses, lateral component stresses, and diagonal component or shearing stresses. This construction causes the refractory insulating member to fracture because of the concentration of stresses around the sides of the opening.

In the insulator of my invention, the opening 4 is provided with a cable-seat surface 6 of such shape transverse to the longitudinal axis of the cable 2, between points 7 and 8, as to cause the cable to spread laterally under tension or load forces. This action redistributes the strands of the cable to utilize the maximum strength of each strand and, since the lateral spread of the cable is less than the width of the opening 4 between the points 7 and 8, there are substantially no lateral or diagonal stresses corresponding to the stresses of former insulators, as above mentioned.

In effect, the load forces of the insulator are substantially all resolved into compression stresses as indicated by arrows D in Fig. 2.

Under tension, the cable 2 tends to flatten at the under side of its curved portion 9 and the strands thereof are rearranged or distributed to be of substantially pyramid shape, in cross-section, as shown in the figures.

It is to be understood that the expression substantially flat, as applied to the seat portion 6, comprehends any shaping of said portion lying between a flat semi-cylindrical surface and a semi-circular surface having a lateral curvature between the points 7 and 8, of a radius sufficiently large to accomplish the purposes of my invention.

While I have shown and described a particular form of my invention, changes may be effected therein without departing from the spirit and scope thereof, as set forth in the appended claims.

I claim as my invention:

1. In an insulator of the link type, the combination with an insulating member having a substantially flat curved seat, of a twisted stranded cable embodying a portion of normally round cross-sectional contour adapted to have a portion thereof flattened under tension against said seat in spaced relation to the outer lateral limits of said seat.

2. In an insulator of the link type, the combination with an insulating member having a substantially flat curved seat, of a twisted stranded cable embodying a portion of normally round cross-sectional contour adapted to have a portion thereof flattened under tension against said seat and the remainder thereof redistributed to substantially the form of a pyramid.

3. In an insulator of the link type, the combination with an insulating member having a substantially flat curved seat, of a twisted stranded cable embodying a portion of normally round cross-sectional contour adapted to have a portion thereof flattened under tension against said seat in spaced relation to the outer lateral limits of said seat and the remainder thereof re-distributed to substantially the form of a pyramid.

In testimony whereof, I have hereunto subscribed my name this 4th day of October, 1922.

NILS A. WAHLBERG.